(12) United States Patent
Kim et al.

(10) Patent No.: US 10,209,831 B2
(45) Date of Patent: *Feb. 19, 2019

(54) DEAD ZONE COMPENSATION FOR TOUCH SCREENS

(71) Applicant: STMicroelectronics Asia Pacific Pte Ltd, Singapore (SG)

(72) Inventors: Rooney Kim, Bakdal 1-Dong (KP); Lokesh Kumar Korapati, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/847,266

(22) Filed: Dec. 19, 2017

(65) Prior Publication Data

US 2018/0107340 A1    Apr. 19, 2018

Related U.S. Application Data

(63) Continuation of application No. 15/093,878, filed on Apr. 8, 2016, now Pat. No. 9,874,974.

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ............................... G06F 3/0418; G06F 3/044
See application file for complete search history.

(56) References Cited

U.S. PATENT DOCUMENTS 9,874,974 B2 * 1/2018 Kim .................. G06F 3/044
2014/0313159 A1 10/2014 Wilson et al.

* cited by examiner

*Primary Examiner* — Liliana Cerullo
(74) *Attorney, Agent, or Firm* — Crowe & Dunlevy (57) ABSTRACT

A method of compensated touch data values disclosed herein includes acquiring touch data values about a dead sensing zone of a touch screen, and determining a peak value of those touch data values. Then, a new peak value is calculated as a function of an average of the peak value and another value of the touch data value, and a sharpness value for the dead sensing zone is generated if a second highest value of the touch data values is less than the new peak value. Thereafter, compensated touch data values are generated for the dead sensing zone if the second highest value is greater than the new peak value.

20 Claims, 9 Drawing Sheets

DEAD ZONE COMPENSATION FOR TOUCH SCREENS

CROSS-REFERENCE TO RELATED APPLICATION

This application is a continuation of U.S. application for patent Ser. No. 15/093,878 filed Apr. 8, 2016, the disclosure of which is incorporated by reference.

TECHNICAL FIELD

The present disclosure relates generally to touch screens and more specifically to methods and techniques for compensating touch screens for dead zones therein.

BACKGROUND

Touch screens are present in many different types of common modern electronic devices, such as smartphones, tablets, smartwatches, wearables, laptop computers, and so on. In these electronic devices the touch screen serves as an output device as well as an input device. The touch screen typically includes display layer and a sensing layer. A touch screen controller is coupled to the sensing layer and operates to process signals therefrom to detect inputs by a user. The sensing layer includes touch sensors, and is attached to or formed as an integral part of the display layer, which may be a LCD, IPS, or AMOLED display, for example.

A typical sensing layer of a touch screen is a capacitive sensor array including a number of force or drive lines and orthogonally arranged sense lines. These lines are made from suitable conductive materials, the drive lines are formed on one sub-layer of the sensing layer and the sense lines formed on another sub-layer, with these sub-layers being separated by a transparent insulating material such as an insulating dielectric layer. The overlap of the drive lines and the orthogonally arranged sense lines with the insulating material between forms an array of capacitive sensors. In operation, a drive signal, which is typically a periodic waveform such as a pulse train, is applied successively to the drive lines. As the drive signal is applied to a given drive line, the capacitive coupling between that drive line and the sense lines results in capacitive coupling of the drive signal to the sense lines to thereby generate sense signals on the sense lines responsive to the drive signal.

The value of the sense signal generated on each sense line is a function of the capacitive coupling between that sense line and the drive line receiving the drive signal. This capacitive coupling changes in response to a user's finger, or other touch device such as a stylus, being proximate the sensor nodes formed at the overlap of the drive and sense lines. This change in capacitive coupling of the drive signal to the sense lines will result in a change in the sense signal generated on the sense lines, and in this way the sense signals indicate whether a user's finger or other touch device is adjacent a given sensor node in the touch panel.

In operation, a user touches a surface of the touch panel or hovers his or her finger (or a suitable object such as a stylus) above the touch panel, and the capacitive sensors generate corresponding electronic sensor signals that are provided to the touch screen controller. From these sensor signals, the touch screen controller determines touch data values, from the data values determines the type of touch event or hover event input by the user to the touch screen, and then provides this information to processing circuitry, such as a system on a chip, in the electronic device.

Conventional sensing techniques work adequately in the absence of hardware defects. However, sometimes there may be a hardware defect with one or more capacitive sensors that arises during manufacture, or sometimes after manufacture, for example as a result of stresses undergone by the device. In such situations, conventional sensing techniques may provide inaccurate results. Thus, new sensing techniques and/or methods of compensation are needed so as to be able to provide for suitable operation even in the presence of hardware defects.

SUMMARY

A method of compensated touch data values disclosed herein includes acquiring touch data values about a dead sensing zone of a touch screen, and determining a peak value of those touch data values. Then, a new peak value is calculated as a function of an average of the peak value and another value of the touch data value, and a sharpness value for the dead sensing zone is generated if a second highest value of the touch data values is less than the new peak value. Thereafter, compensated touch data values are generated for the dead sensing zone if the second highest value is greater than the new peak value.

Another method of compensating touch data values disclosed herein includes acquiring touch data values about a dead sensing zone of a touch screen, with the touch data values about the dead sensing zone being a peak value measured at a first capacitive sensor, an other touch data value measured at a second capacitive sensor, and a floating value measured at a location between the first and second capacitive sensors. The method also includes generating compensated touch data values for the dead sensing zone by calculating a centroid of the peak value, the floating value, the other touch data value, and a further touch data value measured at a third capacitive sensor. Differences between adjacent ones of the peak value, the floating value, the other touch data value, and the further touch data value are calculated. A compensated peak value as a function of the centroid, the peak value, and one of the calculated differences is calculated. A compensated floating value is calculated as a function of the centroid, the floating value, and one of the calculated differences. A compensated other value is calculated as a function of the centroid, the further touch data value, and one of the calculated differences.

Another method of compensated touch data values disclosed herein includes acquiring touch data values about a dead sensing zone of a touch screen, determining a peak value of the touch data values, and calculating a new peak value as a function of an average of the peak value and another value of the touch data values. A sharpness value is generated for the dead sensing zone if a second highest value of the touch data values is less than the new peak value. A compensated sharpness value is generated for the dead sensing zone if the second highest value is greater than the new peak value. A sharpness value for the dead sensing zone is replaced with the compensated sharpness value for the dead sensing zone if the compensated sharpness value is greater than the sharpness value.

A device aspect disclosed herein includes a touch screen formed from a plurality of touch sensors, with the plurality of touch sensors including a plurality of properly functioning touch sensors and at least one improperly functioning touch sensor, and with the at least one improperly functioning touch sensor being capacitively coupled to one of the plurality of properly functioning touch sensors. A touch screen controller is configured for acquiring touch data values about the at least one improperly functioning touch sensor, determining a peak value of the touch data values, and calculating a new peak value as a function of an average of the peak value and another value of the touch data values. The touch screen controller is also configured for generating a sharpness value for the dead sensing zone if a second highest value of the touch data values is less than the new peak value, and generating compensated touch data values for the dead sensing zone if the second highest value is greater than the new peak value.

Another device aspect disclosed herein includes a touch screen controller configured for acquiring touch data values about a dead sensing zone of a touch screen, determining a peak value of the touch data values, and calculating a new peak value as a function of an average of the peak value and another value of the touch data values. The touch screen controller is also configured for generating a sharpness value for the dead sensing zone if a second highest value of the touch data values is less than the new peak value, and generating compensated touch data values for the dead sensing zone if the second highest value is greater than the new peak value.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
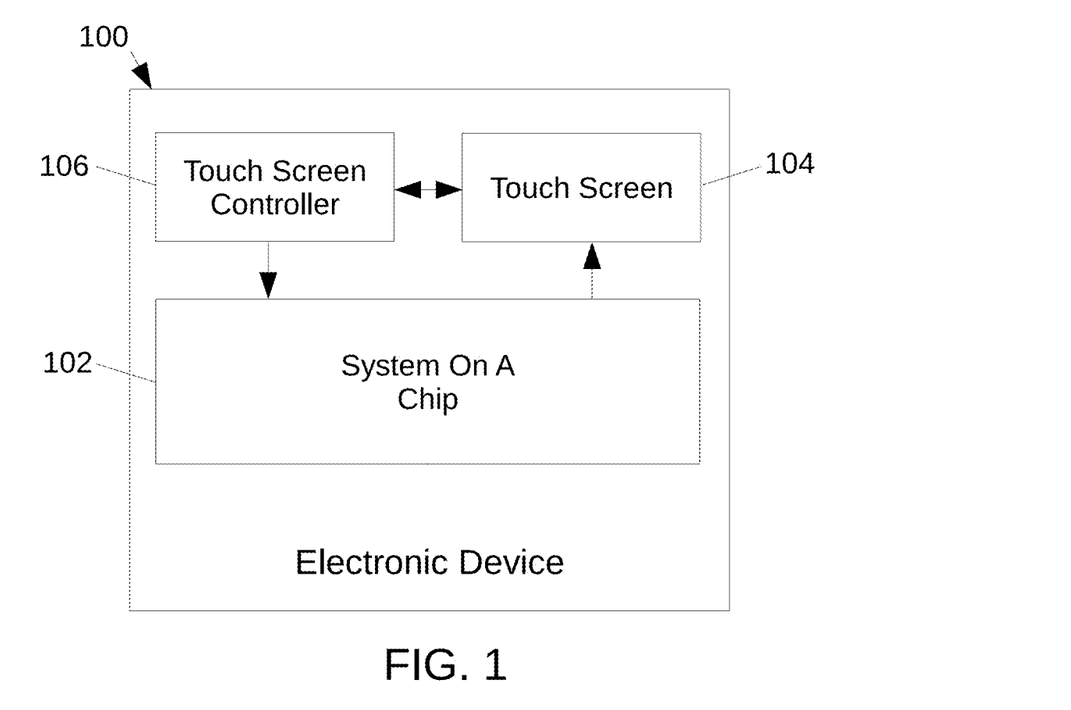
FIG. 1 is a block diagram of an electronic device on which the techniques described herein may be implemented.
Figure 1A:
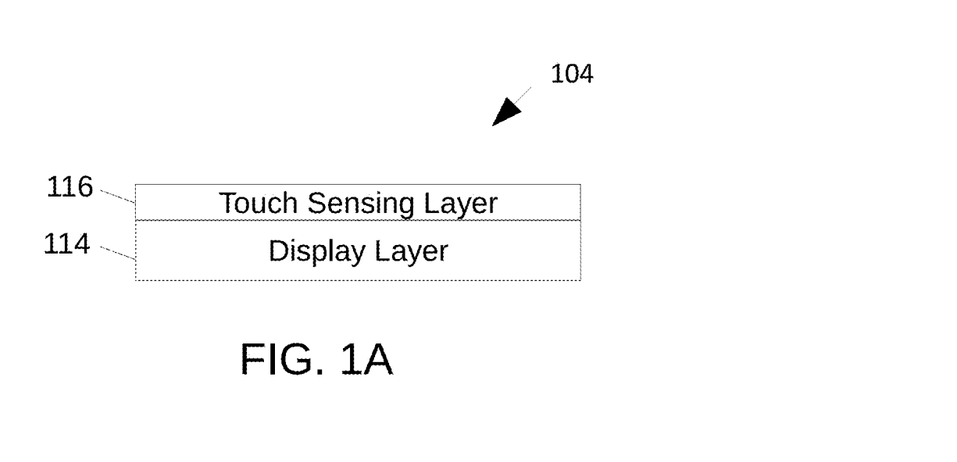
FIG. 1A is a cutaway view of the touch sensitive display of the touch screen of FIG. 1 showing the components thereof.
Figure 1B:
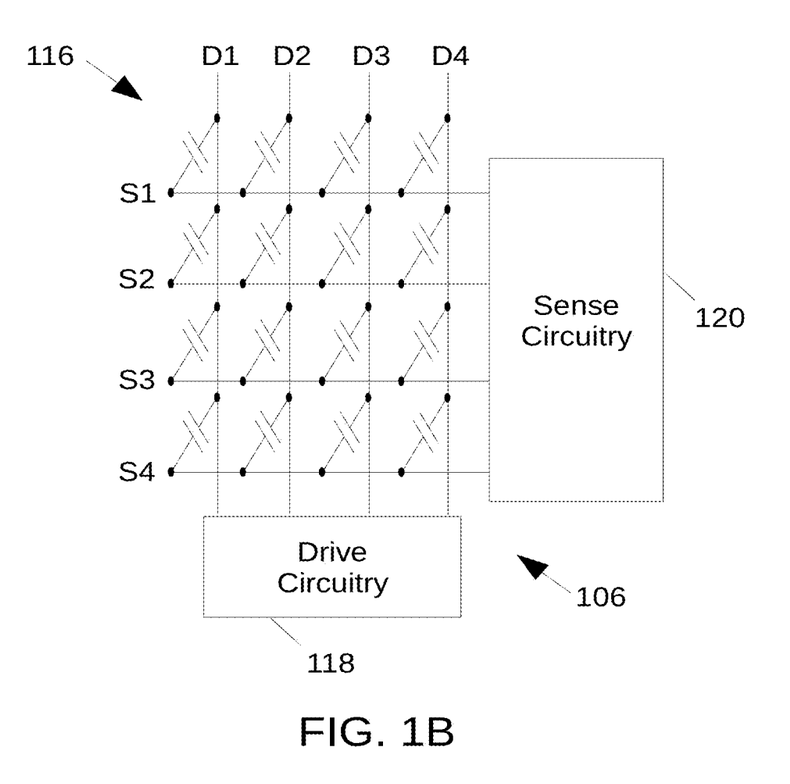
FIG. 1B is a schematic block diagram of the touch screen controller of FIG. 1, and its interconnection with the sense and drive lines of the touch sensing layer of the touch sensitive display of FIG. 1A.

With initial reference to FIGS. 1-1B an electronic device 100 is now described. The electronic device 100 may be a smartphone, smartwatch, wearable, tablet, laptop, or other suitable portable electronic device. The electronic device 100 includes a system on a chip 102 that receives input from a touch screen controller 106 and provides output to a touch screen 104.

The touch screen 104 includes a display layer 114, with a touch sensing layer 116 adjacent thereto. The touch sensing layer 116 includes drive lines D1-D4 that intersect sense lines S1-S4 at some locations. The sense lines S1-S4 are coupled to the touch screen controller 106, while the drive lines D1-D4 are coupled to drive circuitry 118. At each intersection point between the drive line D1 and the sense lines S1-S4, a capacitance is formed.

In operation, the driving circuitry 118 drives the drive lines D1-D4 with periodic signals, such as sine waves or square waves. At certain intersection points between the drive lines D1-D4 and the sense lines S1-S4, touch sensors are formed, the respective sense line S1-S4 incurs a charge injection proportional to the voltage at the drive lines D1-D4, and a capacitance between the respective sense line S1-S4 and the drive lines D1-D4 is at the sensor of that intersection point. These capacitances vary in proximity to conductive objects, such as human fingers and styluses, and are measured by the touch screen controller 106 and processed to be touch data values stored in a matrix having entries that correspond to the various intersections of the drive lines D1-D4 with the force lines S1-S4.

Figure 1C:
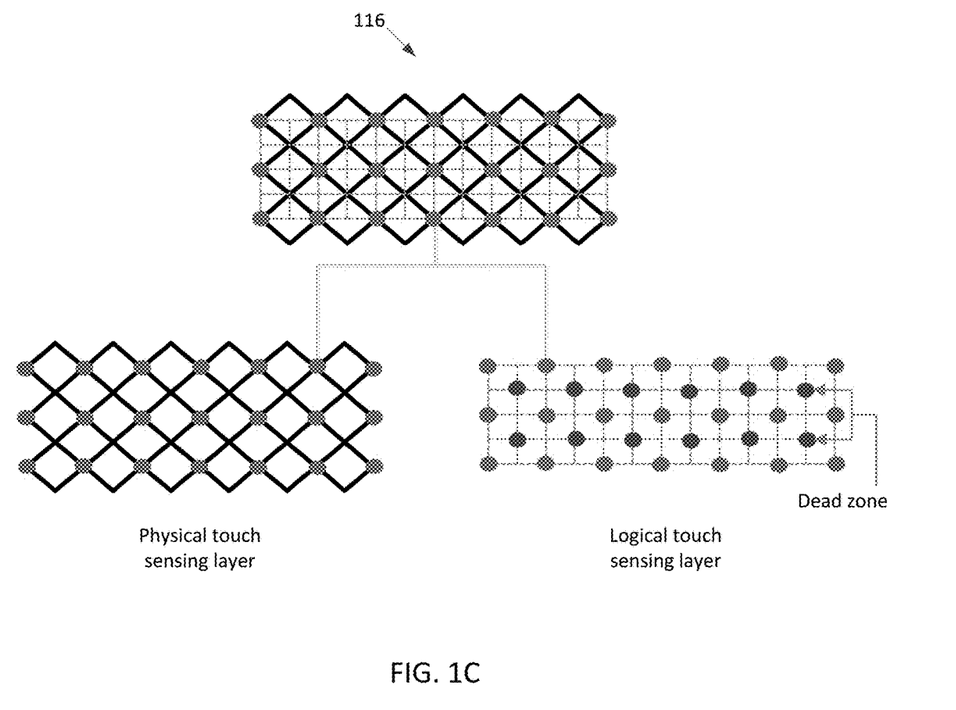
FIG. 1C illustrates the "dead zones" of the touch sensing layer of the touch sensitive display of FIG. 1A.

As shown in FIG. 1C, at some intersection points between the drive lines and sense lines, such touch sensors are not formed, and the charge injected at the sense line S1-S4 may not be as proportional to the voltage at the drive line D1-D4 as at the intersection points where touch sensors are formed. Thus, the capacitances formed at these intersection points are not as sensitive to proximity to conductive objects, and these intersection points may therefore be referred to as "dead zones".

Figure 2:
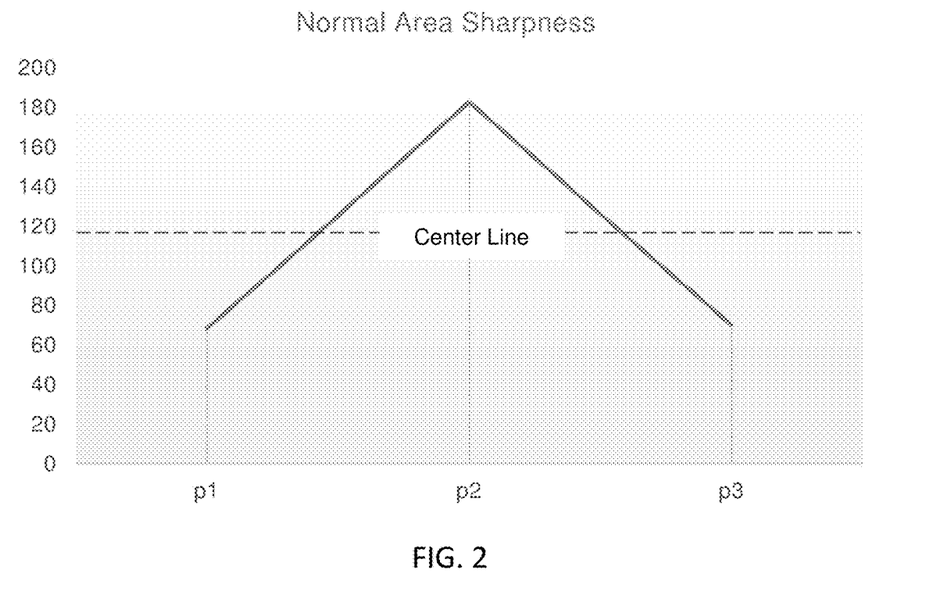
FIG. 2 graph showing the sharpness profile of a live zone of the touch screen of FIG. 1.
Figure 3:
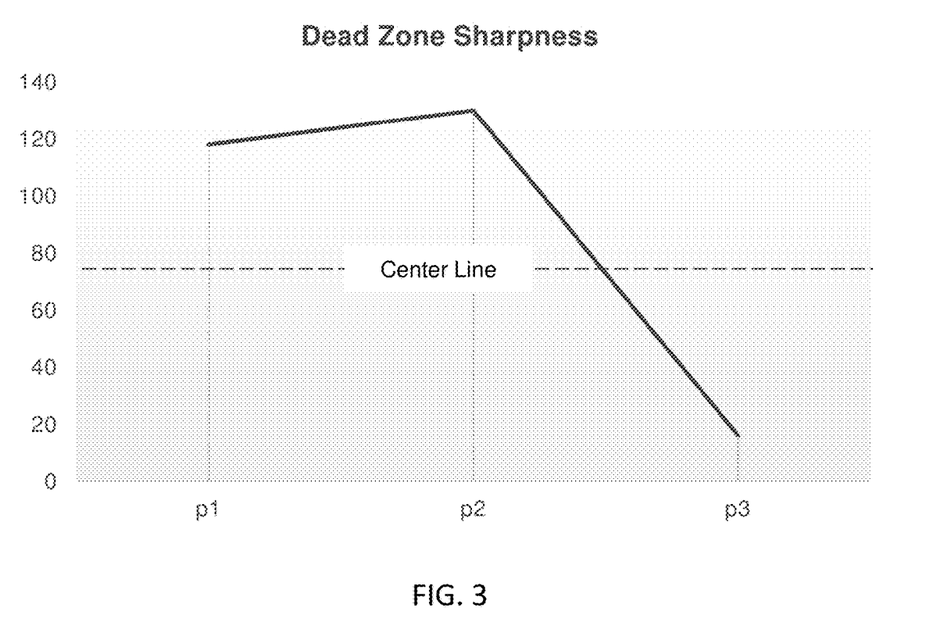
FIG. 3 is a graph showing the sharpness profile of a dead zone of the touch screen of FIG. 1.

As explained, dead sensing zones and live sensing zones are formed in touch sensing layer 116. A graph of sharpness about a live sensing zone is shown in FIG. 2, whereas a graph of sharpness about a dead sensing zone is shown in FIG. 3. The y axis represents intensity, while the x axis represents an offset. As is readily apparent, the live sensing zone includes alternating points of high and low intensity, with the example shown in FIG. 2 having two points below the center line and one point above the center line. As is also readily apparent, the dead sensing zone in FIG. 3 includes two points of high intensity and one point of low intensity, with two points above the center line and one point below the center line, and thus lacks the low-high-low alternating pattern of intensities present in FIG. 2.

Figure 4:
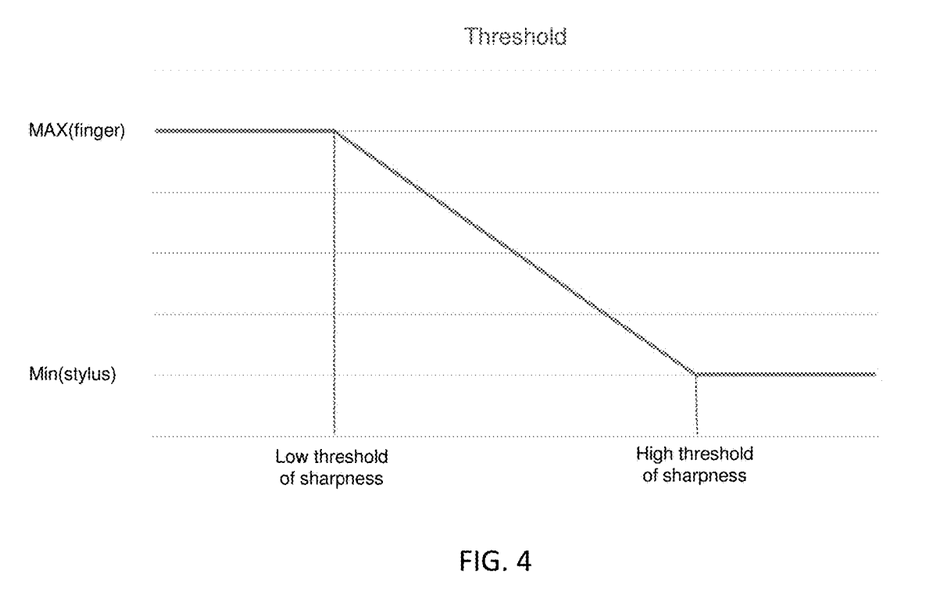
FIG. 4 is a graph showing sensing threshold vs. sharpness of the touch screen of FIG. 1.

Shown in FIG. 4 is a graph of the threshold sensitivity (along the y-axis) vs. sharpness (along the x-axis). As can be seen, at a high sensitivity threshold, a finger may still be detected, while a low sensitivity threshold is used for detection of a stylus. A low sharpness provides for a high sensitivity threshold, as shown, while a high sharpness provides for a low sensitivity threshold, as also shown. The actual sensing is performed at the high intensity points, shown as p2 in FIGS. 2-3. Where the intensity of the sensing point p2 is not much larger than the intensity of the surrounding points p1 and p3, the sharpness is low, rendering the dead zones unable to recognize a stylus. Since this would result in missed or inaccurate recognition of touches and gestures made using a stylus in a dead zone, which would provide for a poor user experience, compensation of the dead zones is desirable.

Figure 5:
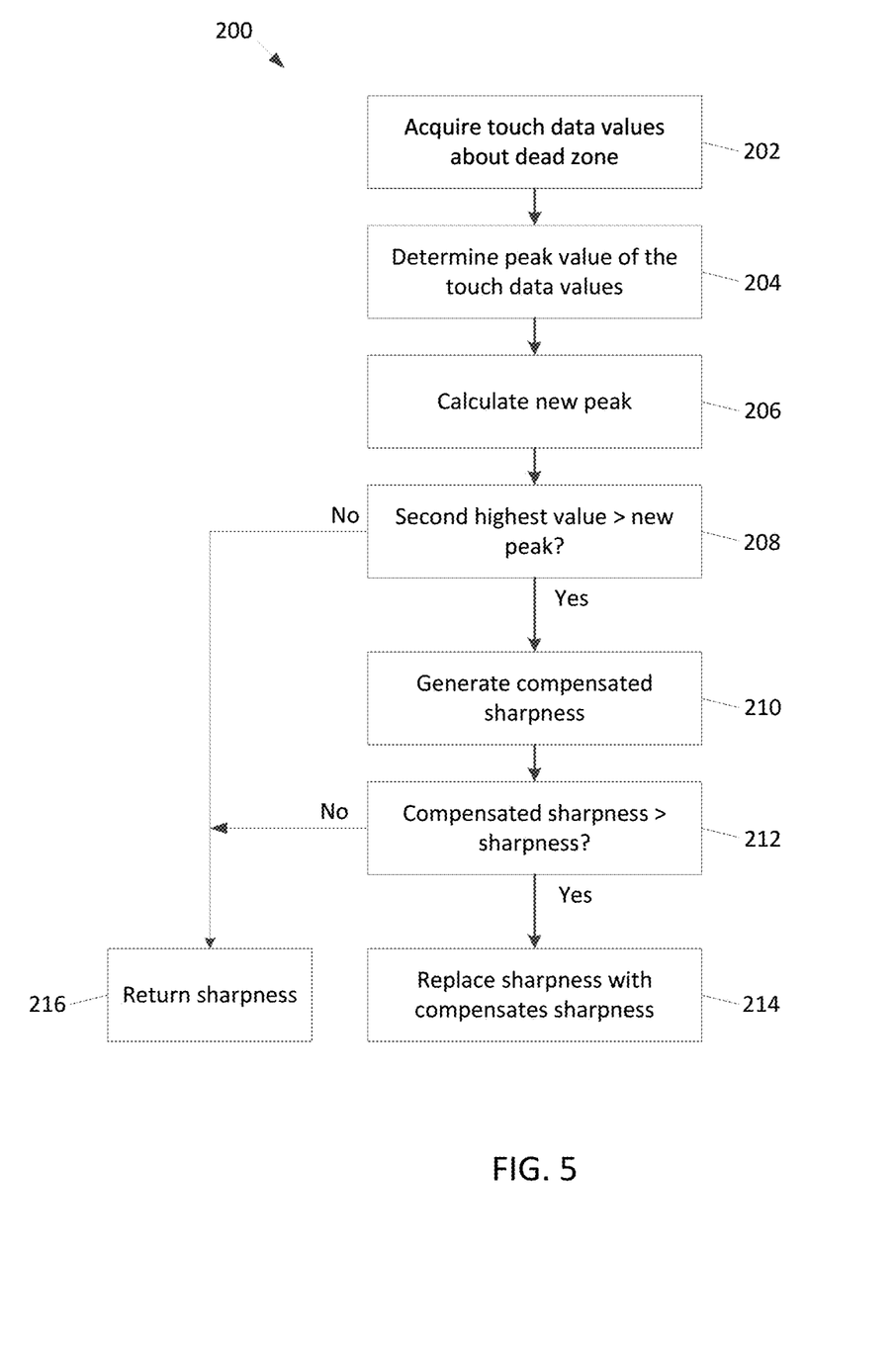
FIG. 5 is a flowchart of a method of compensated touch data values from the dead zones of the touch screen of FIG. 1.

Such a method or technique for compensation is now taught with reference to FIG. 5. To start, the touch screen controller 106 acquires touch data values about the dead zone (Block 202). Then, a peak data value of the acquired touch data values is determined (Block 204). A new peak is then calculated as a function of an average of the peak value and another value of the touch data values, for example as (p3+p2)/2 (Block 206). If a second highest value of the acquired touch data values is less than the new peak (comparison performed at Block 208), then compensation is not used, and the sharpness is calculated and returned as usual, and operation proceeds as usual. If, however, the second highest value of the acquired touch data values is greater than the new peak (comparison performed at Block 208), then compensation is performed resulting in a compensated sharpness (Block 210).

Figure 6:
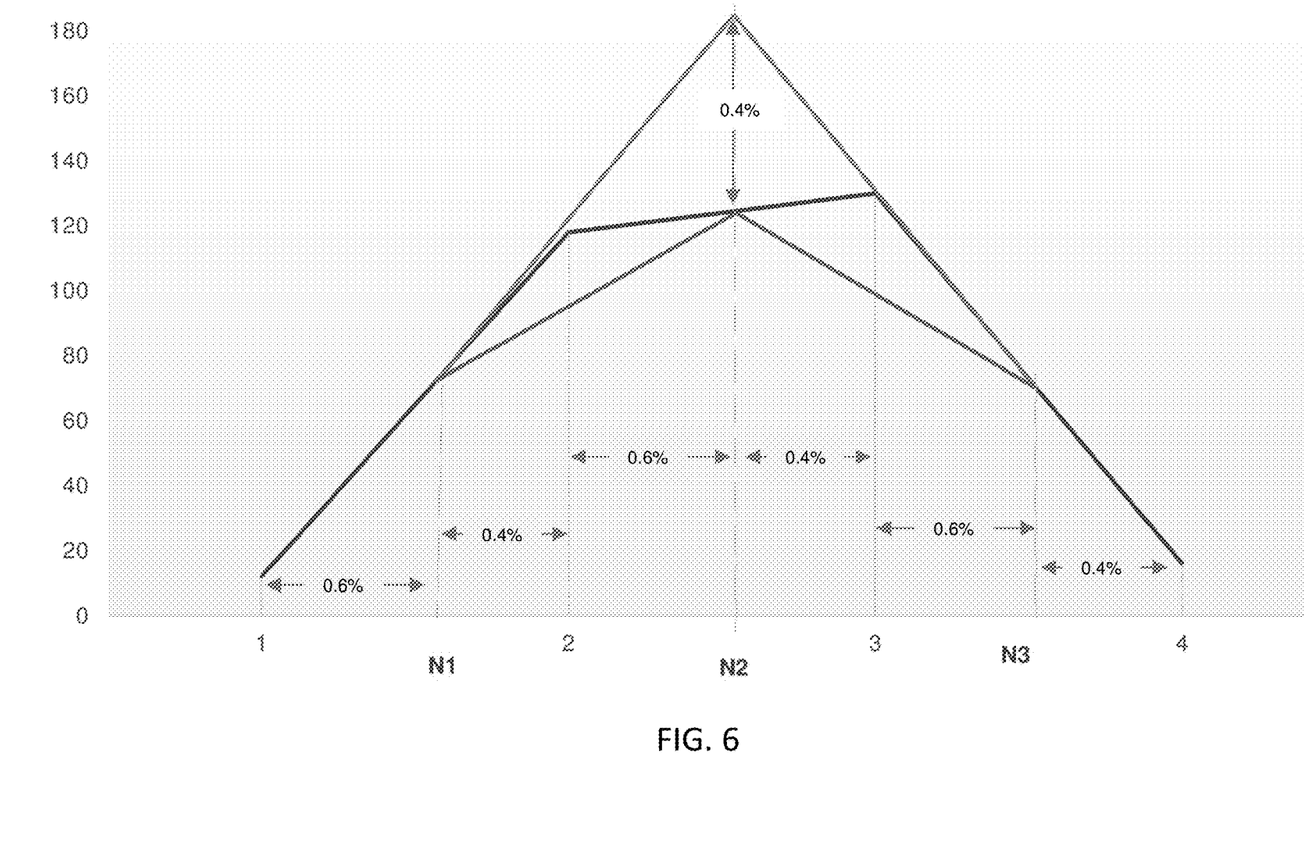
FIG. 6 is a graph of touch data values as compensated using the methods and techniques of FIG. 5.

The compensation will now be described with reference to FIG. 6. First y1, second y2, and third y3 values are calculated as:

$$y1=p3-p2$$

$$y2=p2-p1$$

$$y3=p4-p3.$$

A center of gravity, or centroid, for the touch data values is then calculated as:

$$\text{centroid} = \left| \frac{p4-p2}{p3+\max(p2,p4)} - 2*\min(p2,p4) \right|$$

Using the centroid, a first compensated data value is calculated as:

$$N1=p2-(y2*\text{centroid})$$

An intermediate value used in calculating a second compensated value is then calculated as:

$$N'=p3-(y1*\text{centroid})$$

Now, the second compensated data value is calculated as:

$$N2=N'+(N'*\text{centroid})$$

Then, a third compensated data value is calculated as:

$$N3=p4-(y3*\text{centroid})$$

These compensated data values replace the acquired data values, thus providing for a sharpness profile, as shown in FIG. 5, that permits sensing of a stylus in a dead zone. The compensated sharpness can be calculated as:

$$\text{sharpness}=2*N2-(N1+N3).$$

As can be seen in FIG. 5, application of the compensation to the touch data values provides for a sharpness profile capable of recognizing stylus inputs in the dead zone.

Figure 8:
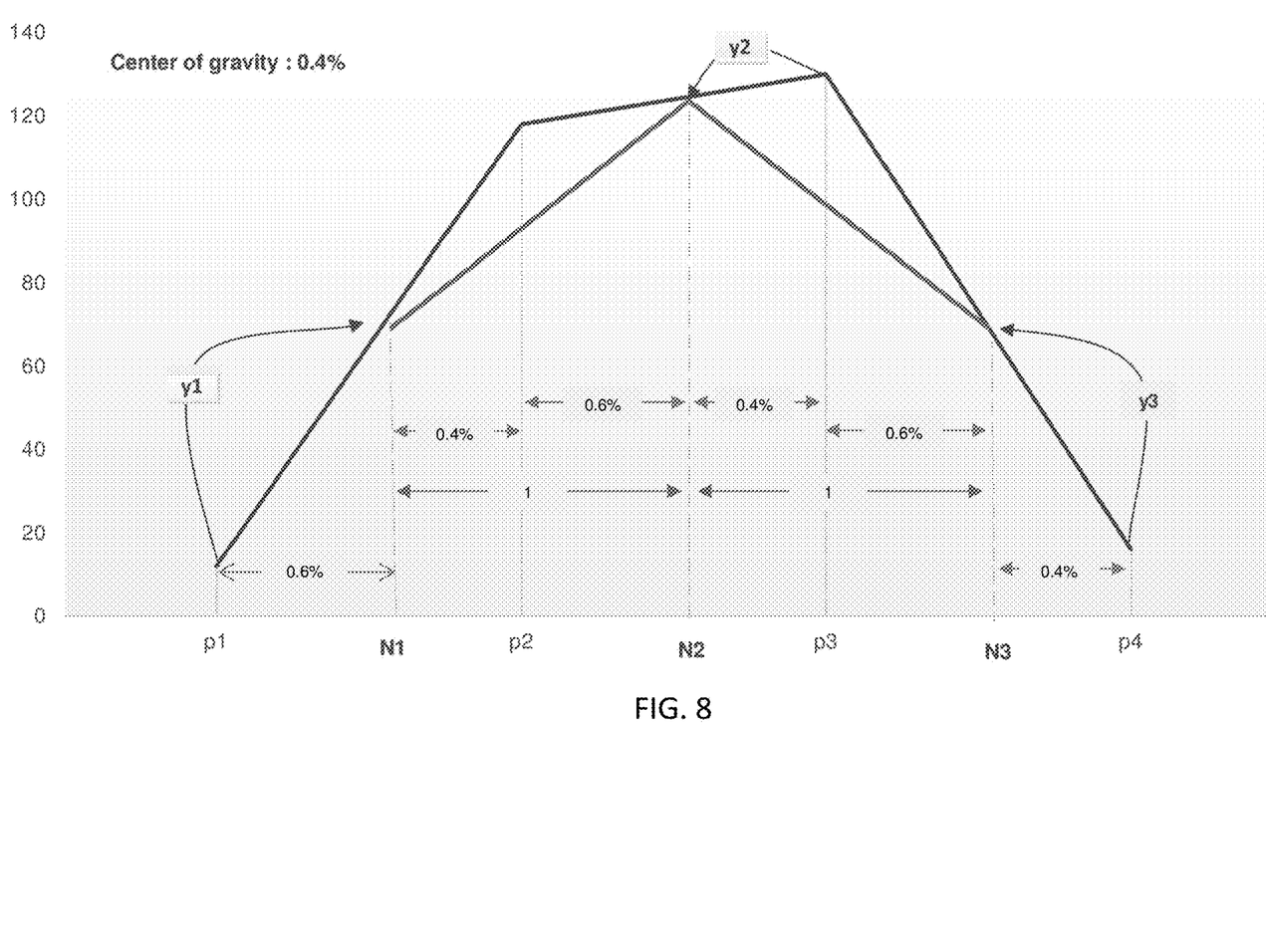
FIG. 8 is another graph of touch data values as compensated using methods and techniques described herein.

In some instances, adequate results may still be obtained without performing all steps as above, or without performing the same steps as above. For example, the intermediate value may be used as the second compensated data value, resulting in the graph shown in FIG. 8.

Figure 7:
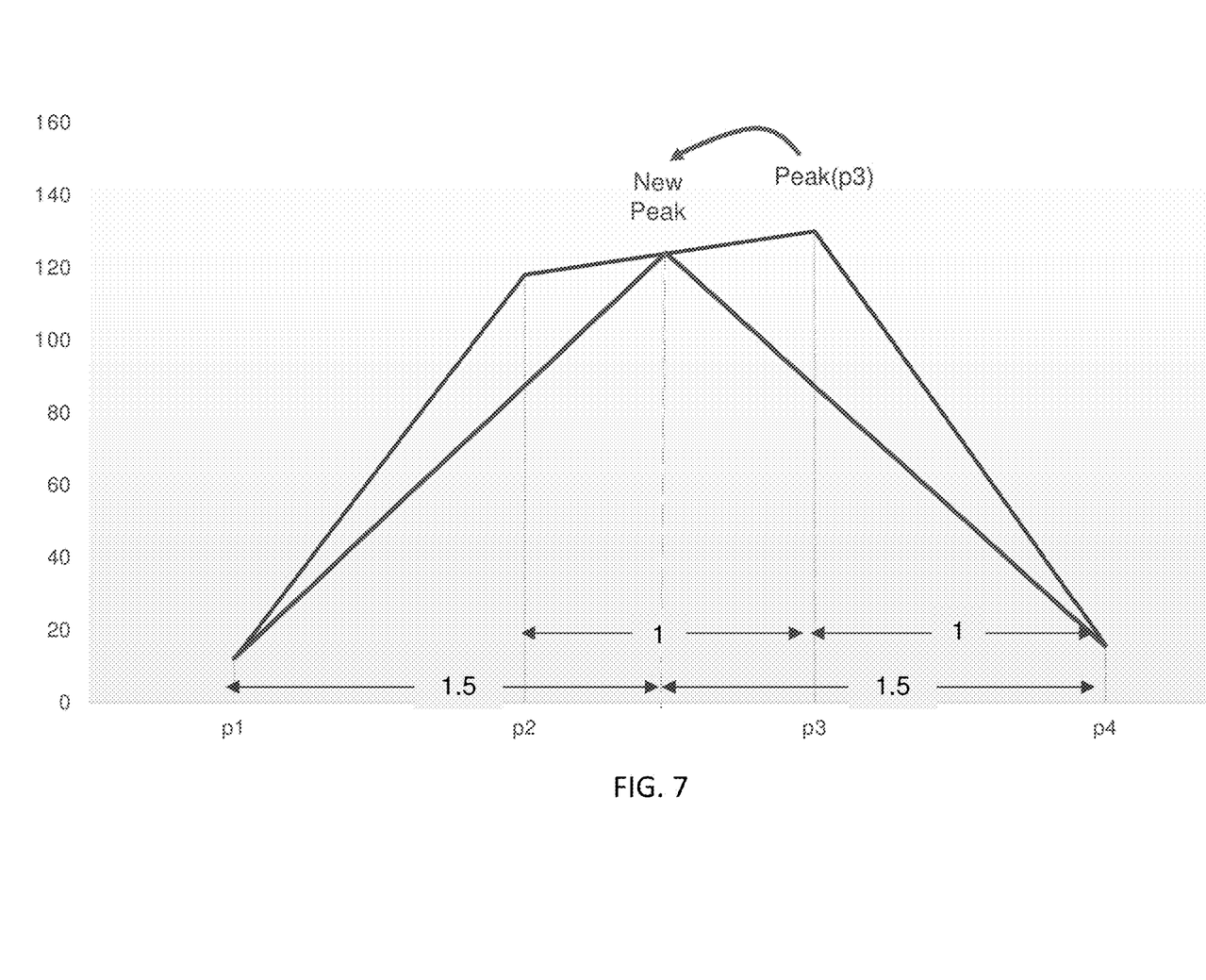
FIG. 7 is a graph of touch data values as compensated using methods and techniques described herein.

As another example, the new peak calculated at Block 206 can be used as the second compensated data value, with the first and second compensated data values being p1 and p4, respectively. The resulting graph of compensated data values using this is shown in FIG. 7.

Each of the steps performed above may be performed in a period of time quicker than a human is capable of, such as in under 1 second, or even under 0.5 second, or even under 0.1 second. It should be appreciated that the touch screen controller 106 is a specific purpose computing device, with transistors and/or logic gates specifically programmed so as to carry out the techniques described herein. Thus, the touch screen controller 106 contains measurable and observable physical differences over an unprogrammed generic purpose computer or processor. It should also be understood that the techniques described herein necessarily arise out of touch screen technology—that is, absent the existence of capacitive touch screens, the techniques herein would not exist. Thus, these techniques are not directed to disembodied information processing, but are instead directed to the determination of the spatial relationship between two physical objects, the stylus and the touch screen. Moreover, these techniques improve the performance of the touch screen technology to which they are applied, increasing the precision and accuracy of the touch detection performed by the touch screen.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. A method, comprising:
acquiring touch data values from capacitive sensing locations located about a dead sensing zone of a touch screen;
calculating a centroid of the acquiring touch data values from capacitive sensing locations located about the dead sensing zone
calculating a first compensated value as a function of the centroid and a difference between one touch data value and another touch data value, wherein said one and another touch data values have highest values of the acquired touch data values from capacitive sensing locations located about the dead sensing zone; and
calculating a second compensated value as a function of the first compensated value and the centroid.

2. The method of claim 1, wherein calculating the first compensated value comprises multiplying the difference by the centroid and summing the result with a selected one of said one and another touch data values.

3. The method of claim 2, wherein summing comprises subtracting and wherein the selected one of said one and another touch data values is the touch data value having a highest value.

4. The method of claim 1, wherein calculating the second compensated value comprises multiplying the first compensated value by the centroid and adding the result to the first compensated value.

5. The method of claim 1, wherein the touch data values comprise a first value (p1) for a first location, a second value (p2) for a second location, a third value (p3) for a third location and a fourth value (p3) for a fourth location, and the centroid is calculated in accordance with the following formula:

$$\text{centroid} = \left| \frac{p4-p2}{p3+\max(p2,p4)} - 2*\min(p2,p4) \right|.$$

6. The method of claim 5, wherein the first compensated value is calculated in accordance with the following formula:

first compensated value=p3−((p3−p2)*centroid).

7. The method of claim 6, the second compensated value is calculated in accordance with the following formula:

second compensated value=first compensated value+
(first compensated value*centroid).

8. The method of claim 1, wherein the centroid represents a percentage offset of the centroid from a location of said one and another touch data values having a highest value.

9. The method of claim 8, wherein calculating the second compensated value comprises adjusting the first compensated value with an increase specified by the percentage offset.

10. A method, comprising:
acquiring touch data values from capacitive sensing locations located about a dead sensing zone of a touch screen;
calculating a centroid of the acquiring touch data values from capacitive sensing locations located about the dead sensing zone
calculating a first compensated value as a function of the centroid and a difference between one touch data value and another touch data value, wherein said one and another touch data values have highest values of the acquired touch data values from capacitive sensing locations located about the dead sensing zone;
determining whether a sharpness value of a profile including the first compensated value at the centroid meets a threshold; and
if not, then for the centroid, calculating a second compensated value as a function of the centroid.

11. The method of claim 10, wherein determining the sharpness value comprises calculating a difference between the first compensated value at the centroid and other values in the profile at locations offset from the centroid.

12. The method of claim 11, wherein the locations offset from the centroid are locations between the capacitive sensing locations for the acquired touch data values.

13. The method of claim 12, wherein the other values are a determined as a function of a difference between acquired touch data values and the centroid.

14. The method of claim 10, wherein calculating the first compensated value comprises multiplying the difference by the centroid and subtracting from a selected one of said one and another touch data values having a highest value.

15. The method of claim 10, wherein calculating the second compensated value comprises multiplying the first peak compensated value by the centroid and adding the result to the first compensated value.

16. The method of claim 10, wherein the touch data values comprise a first value (p1) for a first location, a second value (p2) for a second location, a third value (p3) for a third location and a fourth value (p3) for a fourth location, and the centroid is calculated in accordance with the following formula:

$$\text{centroid} = \left| \frac{p4 - p2}{p3 + \max(p2, p4)} - 2 * \min(p2, p4) \right|.$$

17. The method of claim 16, wherein the first compensated value is calculated in accordance with the following formula:

first compensated value=p3−((p3−p2)*centroid).

18. The method of claim 17, the second compensated value is calculated in accordance with the following formula:

second compensated value=first compensated value+
(first compensated value*centroid).

19. The method of claim 10, wherein the centroid represents a percentage offset of the centroid from a location of said one and another touch data values having a highest value.

20. The method of claim 19, wherein calculating the second compensated value comprises adjusting the first compensated value with an increase specified by the percentage offset.

* * * * *